United States Patent
Rule et al.

(10) Patent No.: US 12,536,525 B2
(45) Date of Patent: *Jan. 27, 2026

(54) APPLETS FOR CONTACTLESS CARD ACTIVATION

(71) Applicant: Capital One Services, LLC, McLean, VA (US)

(72) Inventors: Jeffrey Rule, Chevy Chase, MD (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,492

(22) Filed: Dec. 5, 2023

(65) Prior Publication Data
US 2024/0177140 A1 May 30, 2024

Related U.S. Application Data

(63) Continuation of application No. 17/751,852, filed on May 24, 2022, now Pat. No. 11,875,338, which is a
(Continued)

(51) Int. Cl.
*G06Q 20/34* (2012.01)
*G06Q 20/38* (2012.01)

(52) U.S. Cl.
CPC ......... *G06Q 20/354* (2013.01); *G06Q 20/352* (2013.01); *G06Q 20/3829* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
GB 2516861 A 2/2015
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
(Continued)

*Primary Examiner* — Ari Shahabi
(74) *Attorney, Agent, or Firm* — KDW FIRM PLLC

(57) ABSTRACT

Contactless cards, apparatuses, computer-readable media, and methods for activating a contactless card are provided. A contactless card may communicate, to a client device via a wireless communications interface, a network address associated with a web page. The contactless card may generate a cryptogram responsive to a request from the web page on the client device. The contactless card may communicate the cryptogram to the web page via the wireless communications interface. The contactless card may receive, from the web page, an instruction to activate a payment applet of the contactless card. The contactless card may activate the payment applet based on the instruction.

17 Claims, 13 Drawing Sheets

Related U.S. Application Data continuation of application No. 17/088,399, filed on Nov. 3, 2020, now Pat. No. 11,373,169.

(56) References Cited

U.S. PATENT DOCUMENTS

| | | |
|---|---|---|
| 6,199,114 B1 | 3/2001 | White |
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,741,036 B1* | 8/2017 | Grassadonia ........ G06Q 20/405 |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,438,437 B1* | 10/2019 | Herrington ........... H04L 63/067 |
| 10,453,054 B2 | 10/2019 | Zarakas |
| 10,467,622 B1 | 11/2019 | Rule et al. |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1* | 1/2023 | Cook ..................... H04B 5/72 |
| 11,556,918 B2 | 1/2023 | Mestre |
| 11,615,395 B2 | 3/2023 | McHugh |
| 11,777,933 B2 | 10/2023 | Moreton |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0189321 A1* | 8/2007 | Lee ..................... H04L 12/2827 |
| | | 370/445 |
| 2007/0276765 A1 | 11/2007 | Hazel |
| 2008/0082452 A1 | 4/2008 | Wankmueller |
| 2008/0099552 A1 | 5/2008 | Grillion |
| 2009/0143104 A1 | 6/2009 | Loh |
| 2009/0235339 A1 | 9/2009 | Mennes |
| 2009/0235352 A1* | 9/2009 | Schrijen ............. G06Q 20/3552 |
| | | 235/492 |
| 2009/0282264 A1 | 11/2009 | Amiel |
| 2011/0113245 A1 | 5/2011 | Varadarajan |
| 2011/0155801 A1 | 6/2011 | Rowberry |
| 2012/0143703 A1 | 6/2012 | Wall |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0229372 A1* | 8/2014 | Seo ..................... G06Q 20/227 |
| | | 705/41 |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2015/0348007 A1* | 12/2015 | Khan .................... G06Q 20/321 |
| | | 705/44 |
| 2016/0078430 A1 | 3/2016 | Douglas |
| 2016/0189143 A1 | 6/2016 | Koeppel |
| 2016/0253651 A1 | 9/2016 | Park |
| 2016/0277383 A1 | 9/2016 | Guyomarc'h |
| 2016/0307189 A1 | 10/2016 | Zarakas |
| 2016/0314472 A1 | 10/2016 | Ashfield |
| 2016/0379217 A1 | 12/2016 | Hammad |
| 2017/0017957 A1 | 1/2017 | Radu |
| 2017/0039566 A1 | 2/2017 | Schipperheijn |
| 2017/0068950 A1 | 3/2017 | Kwon |
| 2017/0134176 A1* | 5/2017 | Kim ..................... H04L 9/0866 |

(56) References Cited

U.S. PATENT DOCUMENTS

| | | |
|---|---|---|
| 2017/0330173 A1 | 11/2017 | Woo |
| 2018/0039987 A1 | 2/2018 | Molino |
| 2018/0268132 A1 | 9/2018 | Buer |
| 2018/0300716 A1 | 10/2018 | Carlson |
| 2019/0172055 A1 | 6/2019 | Hale |
| 2019/0303945 A1 | 10/2019 | Mitra |
| 2020/0286071 A1* | 9/2020 | Oepping ............ G06Q 20/02 |
| 2021/0004806 A1 | 1/2021 | Noe |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| GB | 2551907 A | 1/2018 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2020072403 A1 | 4/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008

Ullmann et al., "On-Card" User Authentication for Contactless Smart Cards based on Gesture Recognition, paper presentation LNI proceedings, (2012) 12 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

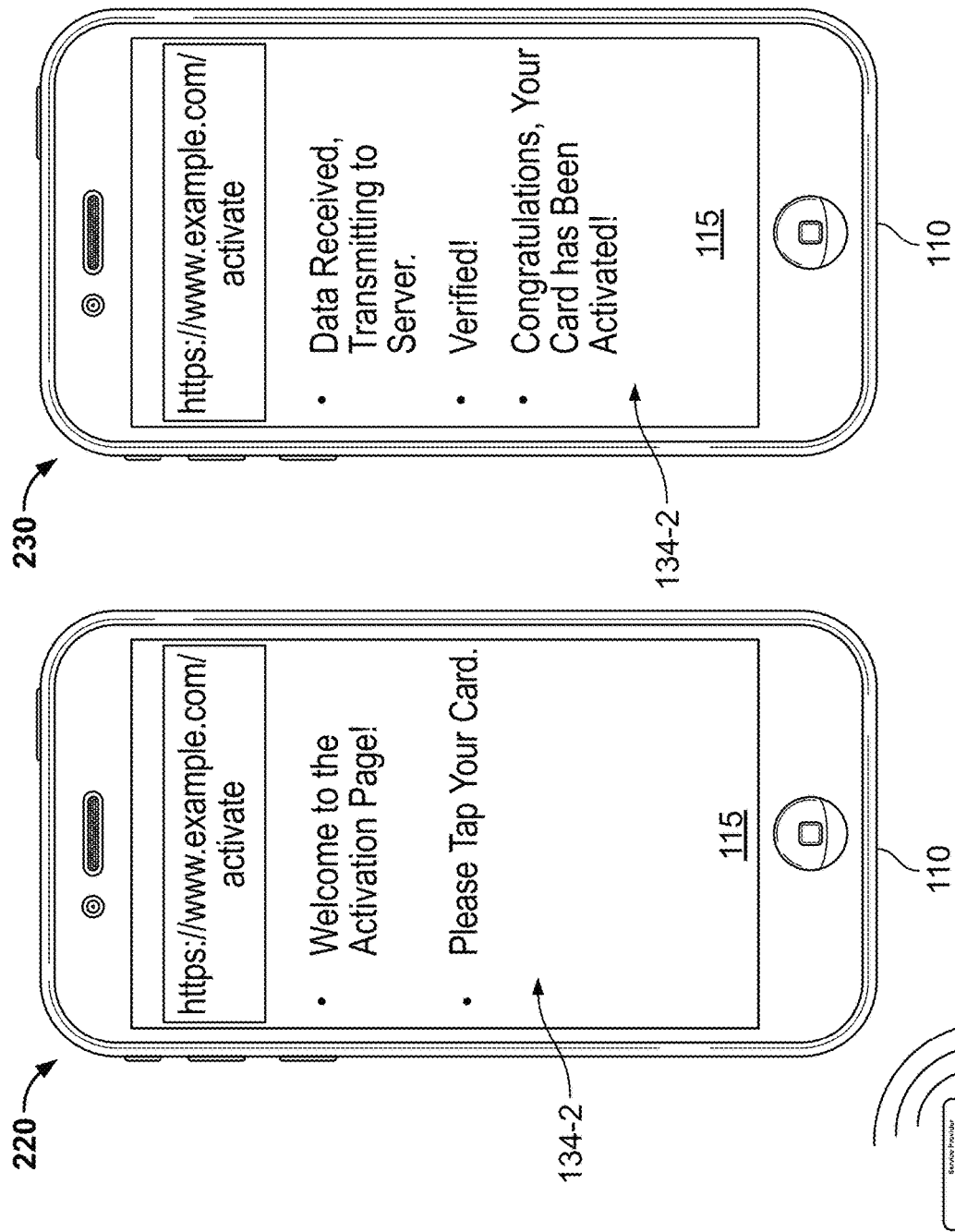

APPLETS FOR CONTACTLESS CARD ACTIVATION

RELATED APPLICATIONS

This application is a continuation of U.S. patent application Ser. No. 17/751,852, filed May 24, 2022, which is a continuation of U.S. patent application Ser. No. 17/088,399, filed Nov. 3, 2020 and now U.S. Pat. No. 11,373,169. The contents of the aforementioned applications are incorporated herein by reference in their entirety.

TECHNICAL FIELD

Embodiments disclosed herein generally relate to computing platforms, and more specifically, to computing platforms for secure, web-based activation of contactless cards.

BACKGROUND

Payment cards are often mailed to customers in an inactivated (or inactive) payment state such that the payment card cannot be used to process a payment (and/or perform some other operations) until activated. Conventional activation solutions include requiring customers to use phone calls, dedicated applications, and other techniques to activate contactless cards. However, these conventional solutions could result in security leaks, user errors, or other negative consequences. Furthermore, requiring a dedicated application (e.g., an application provided by the issuer of the payment card) does not adequately scale as the number of cards and customers grows.

SUMMARY

Contactless cards, apparatuses, computer-readable media, and methods for activating a contactless card. A contactless card may communicate, to a client device via a wireless communications interface, a network address associated with a web page. The contactless card may generate a cryptogram responsive to a request from the web page on the client device. The contactless card may communicate the cryptogram to the web page via the wireless communications interface. The contactless card may receive, from the web page, an instruction to activate a payment applet of the contactless card. The contactless card may activate the payment applet based on the instruction.

BRIEF DESCRIPTION OF THE DRAWINGS

FIGS. 2A-2D illustrate embodiments of a system.

DETAILED DESCRIPTION

Figure 1A:
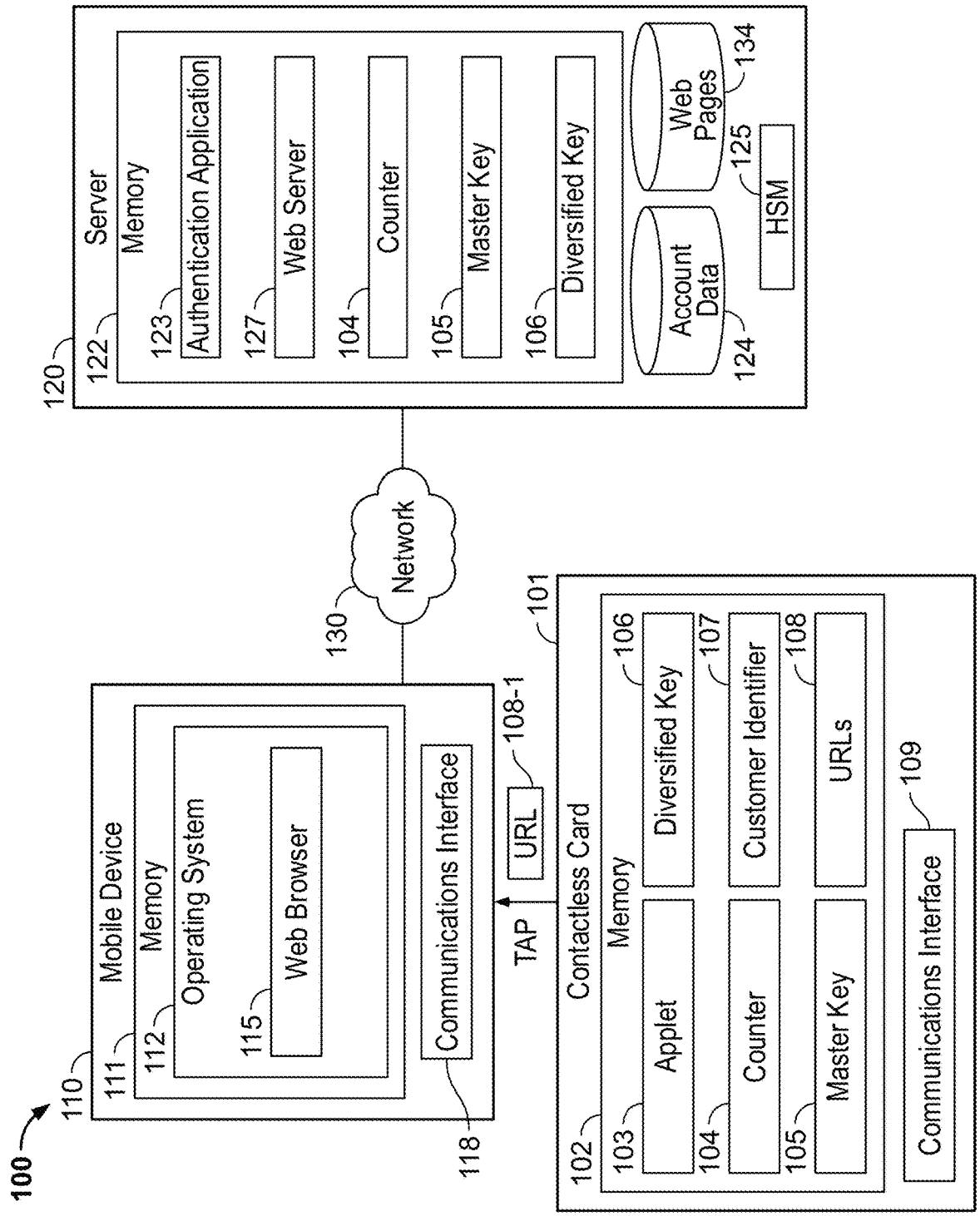
FIGS. 1A-1D illustrate embodiments of a system.

Embodiments disclosed herein provide techniques for secure activation of a payment card using a web browser on a computing device. The computing device may not have a dedicated application installed that facilitates activation of the payment card. For example, a bank or other financial institution may provide a dedicated application that may be used to activate the payment card. However, the user may not have such an application installed on any of their computing devices. Advantageously, however, embodiments disclosed herein may leverage a web page in a web browser to securely read data from a contactless card via near-field communications (NFC). As described in greater detail herein, the data read via NFC may be used to activate the payment card.

In one embodiment, a user may receive a contactless payment card that is in an inactivated payment state such that the card must be activated to be used to process payments. The user may tap the card to a computing device. Doing so causes the card to generate a network address, such as a uniform resource locator (URL), that is directed to a server. The URL may generally be directed to one or more card activation web pages associated with the server. An operating system of the computing device may launch a web browser responsive to receiving the URL. The web browser, when launched, may access the URL received from the contactless card.

The web browser may receive and render a web page at the URL. The web page may include functionality for communicating with a contactless card, e.g., via NFC. The web page may instruct the user to tap the contactless card to the device. In response, the user may tap the contactless card to the device, and the web page and/or web browser may operate a card reader of the device. Doing so may cause or instruct the contactless card to generate a cryptogram, which may be included as part of a data package, such as an NFC Forum Data Exchange Format (NDEF) file. The data package may further include an unencrypted customer identifier (ID) or any other unique identifier. The web page and/or web browser may read the data package via NFC and transmit the data package to the server for decryption. The server may attempt to decrypt the cryptogram using the received data package. If the server is able to decrypt the cryptogram, the server may activate the contactless card, e.g., by updating a database record to reflect that the card has been transitioned from an inactivated payment state to an activated payment state. The server may then send a response to the web browser reflecting that the card has been activated and can be used to process payments (and/or perform other operations).

Advantageously, embodiments disclosed herein provide techniques to securely activate payment cards. By leveraging cryptograms generated by contactless cards, embodiments of the disclosure may securely verify the identity of the user requesting activation with minimal risk of fraudulent activity. Furthermore, by using a web browser, a dedicated client application is not required to activate the card and/or engage in data communications with the contactless card. Using a web browser may advantageously scale the functionality described herein to different entities and any number of users without requiring a dedicated application. Furthermore, by providing a simplified activation process, more activation requests may be handled by the server, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a selfconsistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary system 100, consistent with disclosed embodiments. Although the system 100 shown in FIGS. 1A-1D has a limited number of elements in a certain topology, it may be appreciated that the system 100 may include more or less elements in alternate topologies as desired for a given implementation.

As shown, the system 100 comprises one or more contactless cards 101, one or more computing devices 110, and one or more servers 120. The contactless card 101 is representative of any type of payment card, such as a credit card, debit card, ATM card, gift card, and the like. The contactless card 101 may comprise one or more communications interfaces 109, such as a radio frequency identification (RFID) chip, configured to communicate with a communications interface 118 (also referred to herein as a "card reader", a "wireless card reader", and/or a "wireless communications interface") of the computing devices 110 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 110 is representative of any number and type of computing device, such as smartphones, tablet computers, wearable devices, laptops, portable gaming devices, virtualized computing system, merchant terminals, point-of-sale systems, servers, desktop computers, and the like. The server 120 is representative of any type of computing device, such as a server, workstation, compute cluster, cloud computing platform, virtualized computing system, and the like. Although not depicted for the sake of clarity, the computing device 110, contactless card 101, and server 120 each include one or more processor circuits to execute programs, code, and/or instructions.

As shown, a memory 102 of the contactless card 101 includes an applet 103, a counter 104, a master key 105, a diversified key 106, and a unique customer identifier (ID) 107. The applet 103 is executable code configured to perform the operations described herein. The counter 104, master key 105, diversified key 106, and customer ID 107 are used to provide security in the system 100 as described in greater detail below.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes a web browser 115. The web browser 115 is an application that allows the device 110 to access information via the network 130 (e.g., via the Internet).

As shown, a memory 122 of the server 120 includes an authentication application 123 and a web server 127. Although depicted as separate components of the server 120, in some embodiments, the authentication application 123 and the web server 127 may be integrated into a single component, e.g., a single application including all associated functionality described herein. Similarly, although depicted as part of the server 120, in some embodiments, the authentication application 123 and the web server 127 may be implemented in separate servers. Furthermore, the authentication application 123 and/or the web server 127 may be implemented in hardware, software, and/or a combination of hardware and software.

As described in greater detail herein, the authentication application 123 is configured to facilitate activation of one or more contactless cards 101 via the web browser 115 without requiring the device 110 to include a dedicated application to activate the contactless card for processing payments (and/or other types of operations). The web server 127 is generally configured to process client requests for web pages 134 from the web browsers 115. In at least one embodiment, the web server 127 and the browsers 115 communicate via the hypertext transfer protocol (HTTP).

As stated, a given contactless card 101 may be mailed to a customer in an inactivated payment state, which generally means that the customer must activate the card 101 to process payments (e.g., by using the card 101 at a point of sale (POS) device to pay for a purchase, using the card 101 to pay for an online purchase, etc.). However, to preserve the security of the contactless card 101 and/or the associated account in the account data 124, the system 100 may implement different techniques to securely activate the contactless card 101 using a web browser 115.

In the embodiment depicted in FIG. 1A, the user may tap the contactless card 101 to the device 110 (or otherwise bring the contactless card 101 within communications range of the card reader 118 of the device 110). The applet 103 of the contactless card 101 may then generate a URL 108-1 that is directed to a resource, such as the server 120, one or more card activation web pages 134, and the like. More generally, the URL 108 (and any other URL disclosed herein) may be directed to any component of the server 120 and/or any resource associated with the server 120. In some embodiments, the applet 103 constructs the URL 108 according to one or more rules. In some embodiments, the contactless card 101 stores a plurality of URLs 108 and the applet 103 selects the URL 108-1 from the plurality of URLs 108 based on one or more rules. In some embodiments, the applet 103 may generate the URL 108-1 by selecting one of the plurality of URLs 108 and adding dynamic data as one or more parameters of the URL.

Generally, the web pages 134 may include hypertext markup language (HTML) pages, JavaScript® pages, and/or any other type of page that can be rendered by a web browser 115. In some embodiments, the web pages 134 and/or URL 108 may be directed to the authentication application 123. In some embodiments, the web pages 134 may provide interfaces to activate the contactless card 101 using the web pages 134 in the web browser 115. Furthermore, in some embodiments, the web pages 134 may be directed to web-based front-ends exposed by the authentication application 123.

Once generated, the OS 112 may read the URL 108-1. The OS 112 may be in any state, such as on a home screen of the OS 112, displaying one or more other applications, and/or displaying the web browser 115. Regardless of the state of the OS 112, reading the URL 108-1 causes the OS 112 to launch the web browser 115 and/or bring the web browser 115 to the foreground of the OS 112.

Figure 1B:
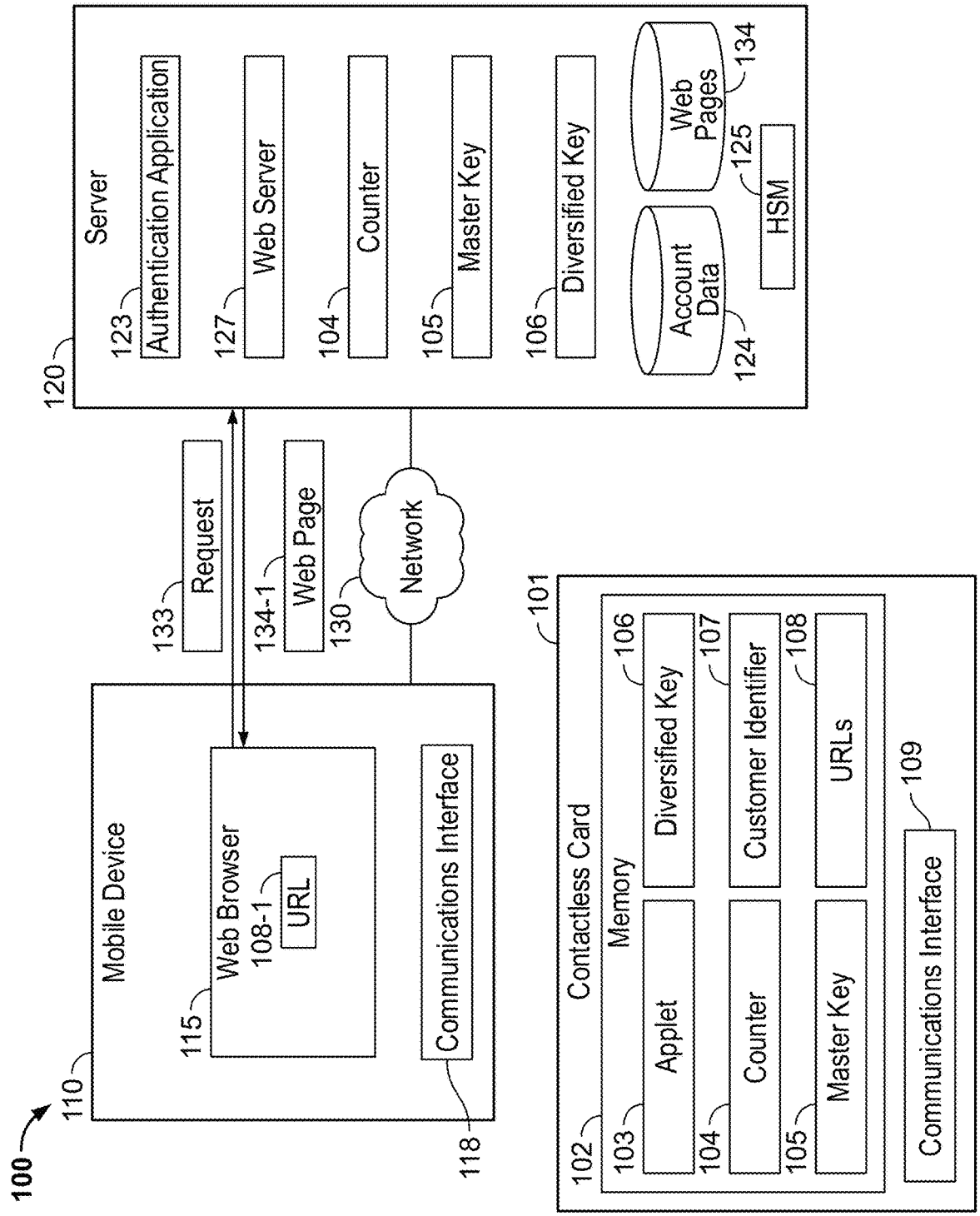

FIG. 1B depicts an embodiment where the OS 112 launches the web browser 115 and provides the URL 108 to the web browser 115 as a parameter. Doing so causes the web browser 115 to generate a request 133 that specifies the URL 108. The request 133 may be an HTTP request transmitted to the web server 127. In response, the web server 127 of the server 120 may transmit a web page 134-1 to the web browser 115, which may load, render, or otherwise access the web page 134-1.

Figure 1C:
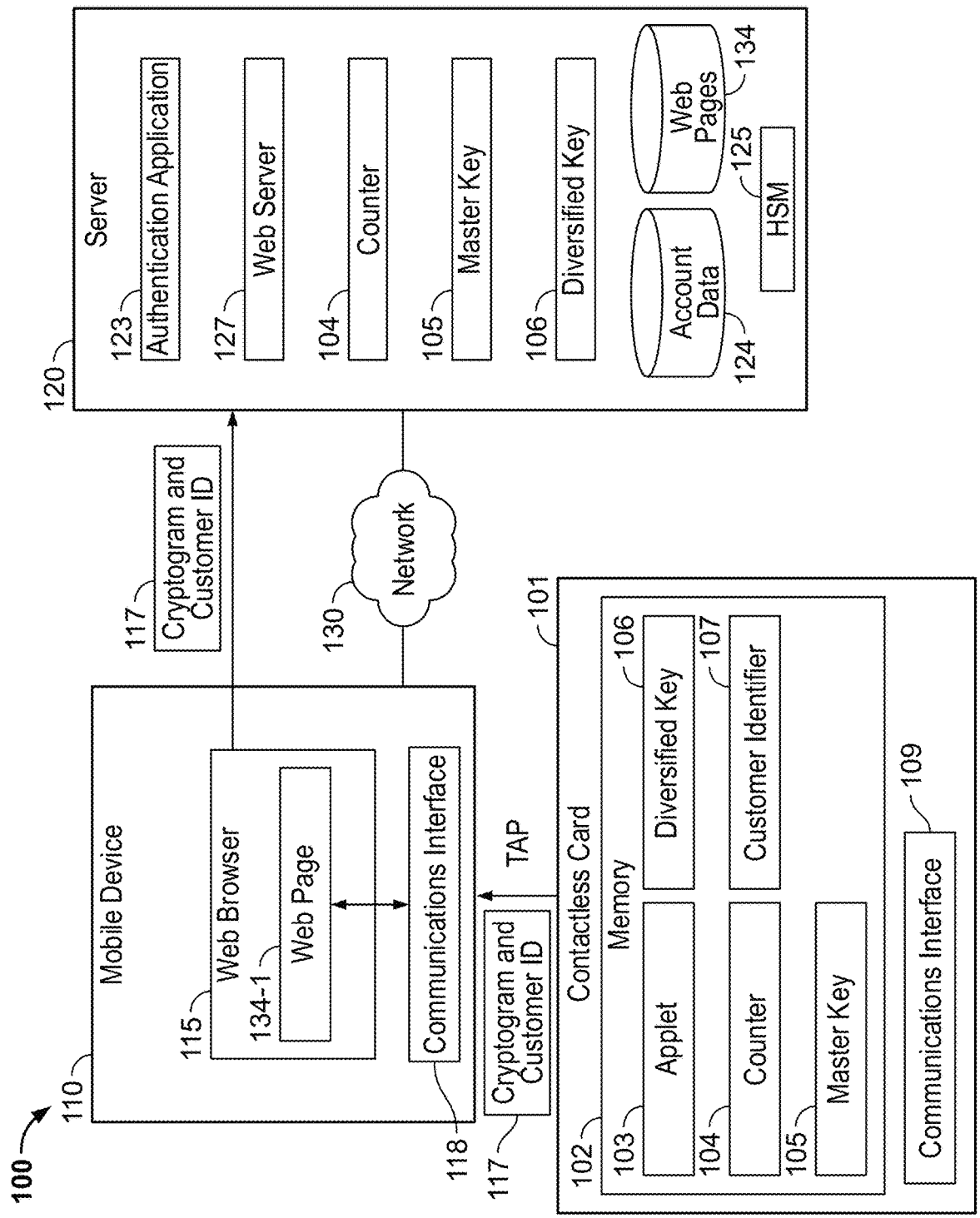

FIG. 1C depicts an embodiment where the web browser 115 has loaded the web page 134-1. Advantageously, the web page 134-1 includes functionality to wirelessly read data generated by the contactless card 101 and/or wirelessly write data to the memory 102 of the contactless card 101. More generally, a given web page 134 and/or the web browser 115 may include functionality control the communications interface 118 and communicate with the card 101 without requiring a dedicated operating system application (e.g., an application store application) to perform these functions. In at least one embodiment, the functionality is provided via one or more application programming interfaces (APIs). The APIs may be defined by the Web NFC Draft Community Group Report. Therefore, the web page 134-1 (and any other web pages 134) may control the NFC capabilities of the communications interface 118 without requiring a dedicated application.

In some embodiments, the web page 134-1 in the web browser 115 may output an indication requesting or instructing the user to tap the contactless card 101 to the device 110 to activate the contactless card 101. Generally, once the contactless card 101 is brought within communications range of the communications interface 118 of the device 110, the applet 103 of the contactless card 101 may generate a cryptogram. The cryptogram may be based on the customer ID 107 of the contactless card 101. The cryptogram may be generated based on any suitable cryptographic technique. In some embodiments, the applet 103 may include the cryptogram and an unencrypted customer ID 107 (and/or any other unique identifier) in a data package 117. In at least one embodiment, the data package 117 including the cryptogram and unencrypted customer ID 107 is an NDEF file.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the master key 105 and the data as input a cryptographic algorithm. For example, encrypting the customer ID 107 with the master key 105 may result in the cryptogram. Similarly, the server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the device 110). When preparing to send data (e.g., to the server 120 and/or the device 110), the applet 103 of the contactless card 101 may increment the counter value 104. The applet 103 of the contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data) using the diversified key 106 and the data as input to the cryptographic algorithm. For example, encrypting the customer ID 107 with the diversified key 106 may result in the encrypted customer ID (e.g., a cryptogram) included in the data package 117. The web browser 115 and/or the web page 134 may then read the data package 117 including the cryptogram and unencrypted customer ID 107 via the communications interface 118.

Regardless of the encryption technique used, the web page 134 and/or web browser 115 may then transmit the data package 117 including the cryptogram and unencrypted customer ID 107 to the server 120 via the network 130. The web page and/or web browser 115 may further indicate, to the server 120, that the data package 117 including the cryptogram and unencrypted customer ID 107 was read from the contactless card 101 via the card reader 118 of the device 110. Once received, the authentication application 123 and/or the web server 127 may attempt to authenticate the cryptogram. For example, the authentication application 123 may attempt to decrypt the cryptogram using a copy of the master key 105 stored by the server 120. In some embodiments, the authentication application 123 may identify the master key 105 and counter value 104 using the unencrypted customer ID 107 included in the data package 117. In some examples, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the cryptogram in the data package 117.

Regardless of the decryption technique used, the authentication application 123 may successfully decrypt the cryptogram, thereby verifying or authenticating the cryptogram in the data package 117 (e.g., by comparing the customer ID 107 that is produced by decrypting the cryptogram to a known customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the cryptogram using the keys 105 and/or 106 and a cryptographic function. Similarly, the secure element and/or HSM 125 may generate the diversified key 106 based on the master key 105 and counter value 104 as described above. If the decryption is successful, the authentication application 123 may activate the contactless card, e.g., by updating a record in the account data 124 corresponding to the contactless card 101. The record may be updated to reflect that the contactless card 101 has been transitioned from an inactivated payment state to an activated payment state. In some embodiments, the authentication application 123 may transmit a decryption result to the web browser 115 and/or the web page 134-1 indicating whether the decryption was successful or unsuccessful. The web page 134-1 may then perform one or more operations based on whether the decryption result indicates the cryptogram was decrypted and/or not decrypted.

If, however, the authentication application 123 is unable to decrypt the cryptogram to yield the expected result (e.g., the customer ID 107 of the account associated with the contactless card 101), the authentication application 123 does not validate the cryptogram of the data package 117. In such an example, the authentication application 123 determines to refrain from activating the contactless card. The authentication application 123 and/or the web server 127 may transmit an indication of the failed decryption to the web browser 115. The web page 134-1 may then display an indication of the failed decryption, and therefore unsuccessful card activation, to the user via the web browser.

Figure 1D:
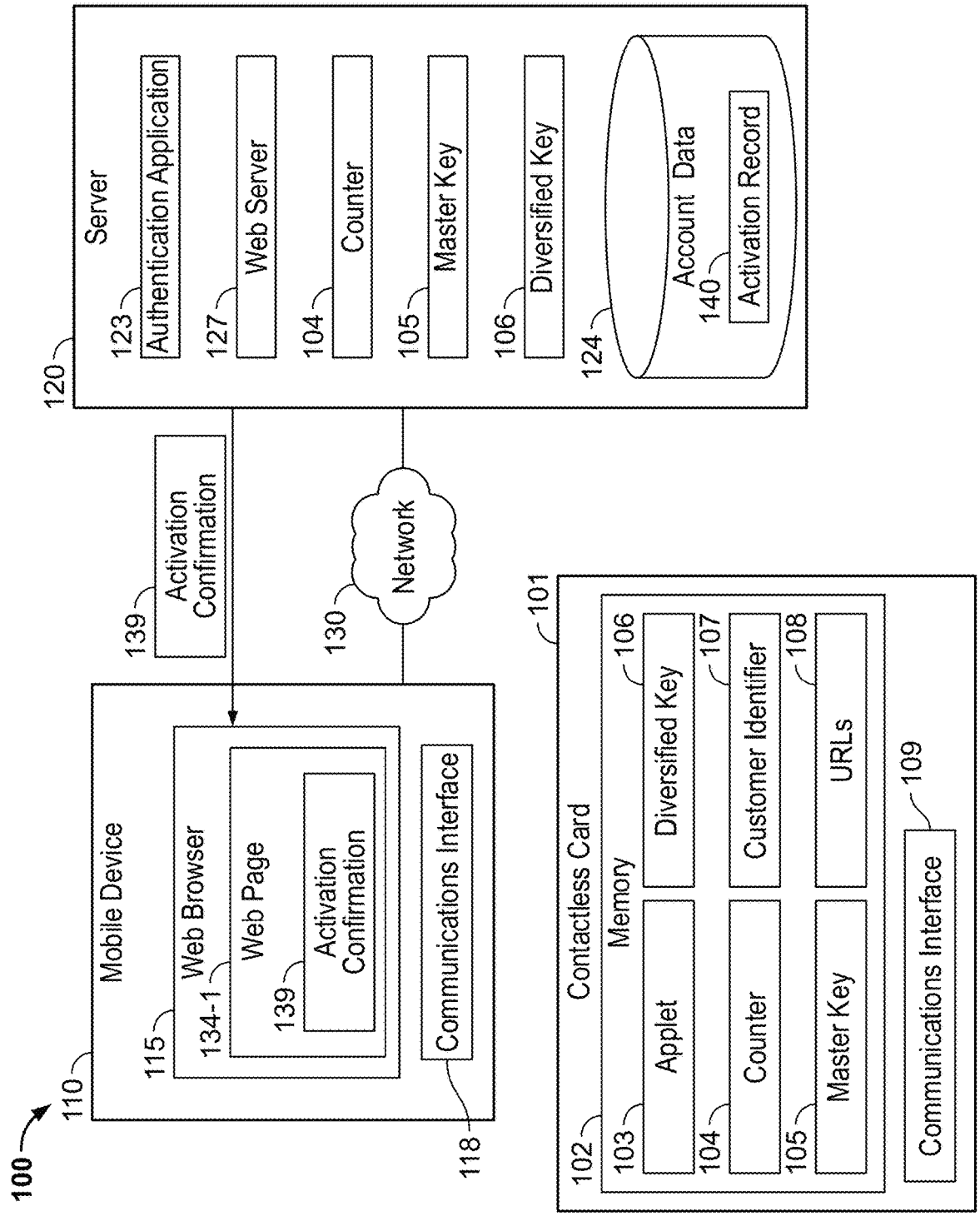

FIG. 1D illustrates an embodiment where the authentication application 123 has successfully decrypted the cryptogram of the data package 117, thereby verifying (or authenticating) the cryptogram. In response, the authentication application 123 may store an activation record 140 in the account data 124, where the activation record 140 reflects that the contactless card 101 has been activated and can be used to process payments. Furthermore, as shown, the authentication application 123 and/or web server 127 transmits a confirmation 139 to the device 110, where the confirmation 139 indicates that the authentication application 123 successfully decrypted the cryptogram of the data package 117 and that the contactless card 101 has been activated. The web page 134-1 may be updated to reflect the confirmation 139. In another embodiment, the confirmation 139 is a web page 134, and the web browser 115 may display the confirmation 139 web page 134.

In some embodiments, the web page 134-1 may instruct the user to tap the contactless card 101 to the device 110. In response, the web page 134-1 may control the card reader 118 and cause the card reader 118 to store an indication in the memory 102 of the contactless card 101 reflecting that the card 101 has been activated. Doing so may allow a portion of the applet 103, a payment applet, and/or other logic in the card 101 to be activated or otherwise enabled for use.

Once activated, the customer may use the contactless card 101 to process payments. For example, the customer may visit a merchant's web page using the web browser 115 and provide card number, expiration date, and card verification value (CVV) of the card 101 as payment information to pay for a purchase on the web page. The merchant's web page may then submit a request to the server 120 to process the requested payment. The server 120 may approve the request based at least in part on the activation record 140.

Advantageously, the contactless card 101 is securely activated without requiring the device 110 to execute a dedicated client application provided by an entity associated with the contactless card 101 (e.g., the application provided by the financial institution associated with the contactless card 101). Furthermore, the security of the card 101 is enhanced by using the cryptogram generated by the contactless card 101 as a condition to activation.

Figure 2B:
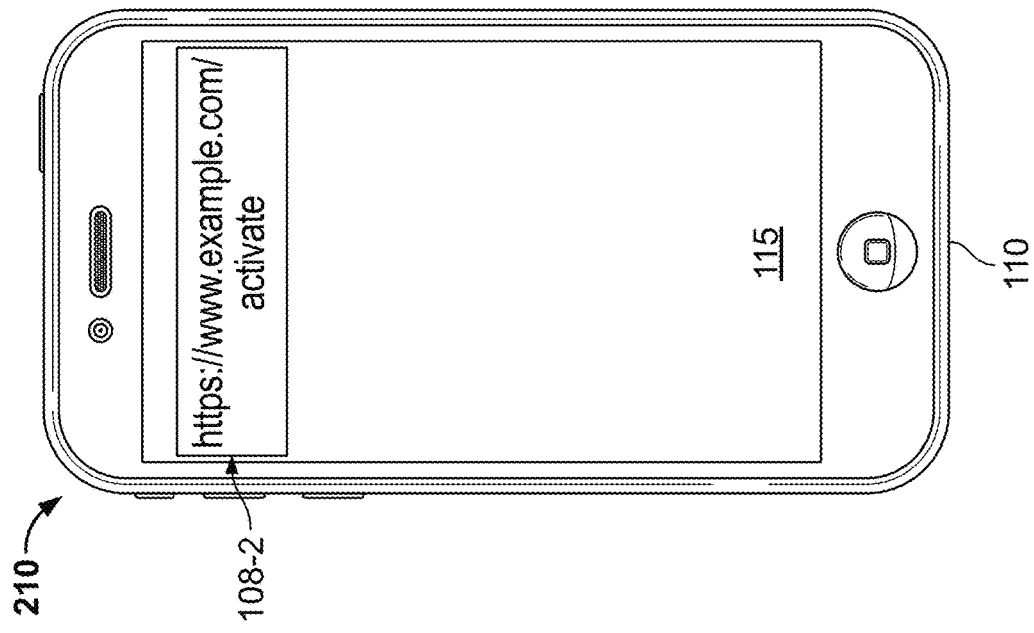
Figure 2A:
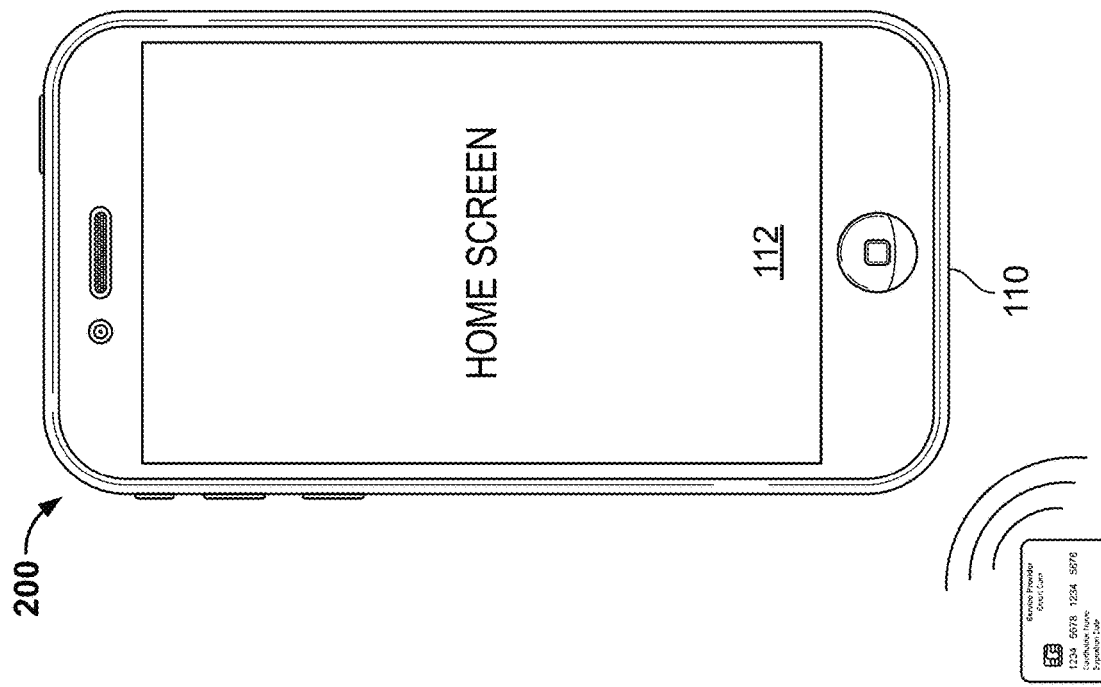

FIG. 2A is a schematic 200 depicting an example computing device 110, consistent with disclosed embodiments. More specifically, FIG. 2A depicts an embodiment where the device 110 outputs a home screen, or page, of the OS 112, and a contactless card 101 is tapped to the device 110. Although the home screen is depicted, the OS 112 and/or the device 110 may be in any powered-on state when a contactless card 101 is tapped to the device 110. As stated, when the card 101 is tapped to the device 110, the applet 103 may provide URL to the device 110. For example, as stated, the applet 103 may generate a that is directed to a web page 134 to activate the contactless card. Therefore, when the card 101 is tapped to the device in FIG. 2A, the card 101 is in an inactivated payment state, and cannot be used to process payments. The applet 103 may then transmit the URL to the mobile device 110. Once received, the OS 112 may perform an action, e.g., launching the web browser 115 that is registered with the OS 112 to open the URL. Advantageously, doing so provides a solution for URL-based authentication that does not require an active application running in the foreground of the OS 112.

FIG. 2B is a schematic 210 illustrating an embodiment where the web browser 115 of the device 110 is launched responsive to receiving a URL 108-2 from the contactless card in FIG. 2A. Generally, the OS 112 may launch the web browser 115 and provide the URL 108-2 to the web browser 115 as input. Doing so may cause the web browser to generate an HTTP request to access the resource at the specified URL 108-2. The URL 108-2 may generally be directed to the server 120, the authentication application 123, and/or one of the web pages 134.

FIG. 2C is a schematic 220 reflecting an embodiment where the web browser 115 has loaded and rendered a web page 134-2 at the URL 108-2 received from the contactless card 101. The web page 134-2 may be received from the web server 127 responsive to an HTTP request from the web browser 115 specifying the URL 108-2. The web page 134-2 may include similar capabilities to the web page 134-1, including the ability to communicate with the contactless card 101, e.g., by reading data generated by the contactless card 101 and/or writing data to the memory of the contactless card 101. More generally, web page 134-2 and/or the web browser 115 may therefore generally be able to control the NFC capabilities of the communications interface 118 to communicate with the contactless card 101 via NFC.

As shown, the web page 134-2 instructs the user to tap the contactless card 101 to the computing device 110 to activate the card 101. When the card 101 comes within communications range of the card reader 118, the web page 134-2 controls the card reader 118, and causes the card reader 118 to instruct the applet 103 of the contactless card 101 to generate a diversified key 106 as described above, and use the generated diversified key 106 to generate a cryptogram (e.g., an encrypted customer ID 107). The applet 103 may further generate an NDEF file or other data package that includes the cryptogram and an unencrypted identifier, e.g., an unencrypted customer ID 107.

The web browser 115 and/or the web page 134-2 may then read the data package or NDEF file, e.g., via NFC. Once read, the web browser 115 and/or the web page 134-2 may transmit the data package to the server 120 for processing. The web page 134-2 may optionally process the data package, e.g., to format the data package, etc. The web page 134-2 and/or web browser 115 may further indicate, to the server 120, that the cryptogram was read from the contactless card 101 via the card reader 118 of the device 110.

Once received, the authentication application 123 may attempt to verify the cryptogram in the data package. In at least one embodiment, the unencrypted customer ID 107 provided by the applet 103 may be used by authentication application 123 to identify the relevant account, counter value 104, and/or master key 105 in the account data 124. The authentication application 123 may attempt to decrypt the cryptogram by providing the master key 105 and incremented counter value 104 as input to the cryptographic algorithm, which produces the diversified key 106 as output. The resulting diversified key 106 may correspond to the instance of the diversified key 106 generated by the contactless card 101 to create the cryptogram, which may be used to decrypt the cryptogram. Generally, the authentication application 123 may transmit a decryption result to the web browser 115 and/or the web page 134-2 indicating whether the decryption was successful or unsuccessful. If the decryption is successful, the authentication application 123 may transition the contactless card 101 from an inactive payment state to an active payment state, e.g., by updating one or more records in the account data 124.

FIG. 2D is a schematic 230 illustrating an embodiment where the server 120 decrypted the cryptogram generated by the contactless card 101 and read by the web page 134-2. As stated, the server 120 may activate the contactless card 101 for payment based on the decryption of the cryptogram generated by the contactless card 101. The server 120 may communicate a result of the decryption to the web page 134-2. As shown, the web page 134-2 is updated to reflect that the decryption was successful and the contactless card 101 has been activated to process payments.

Figure 3A:
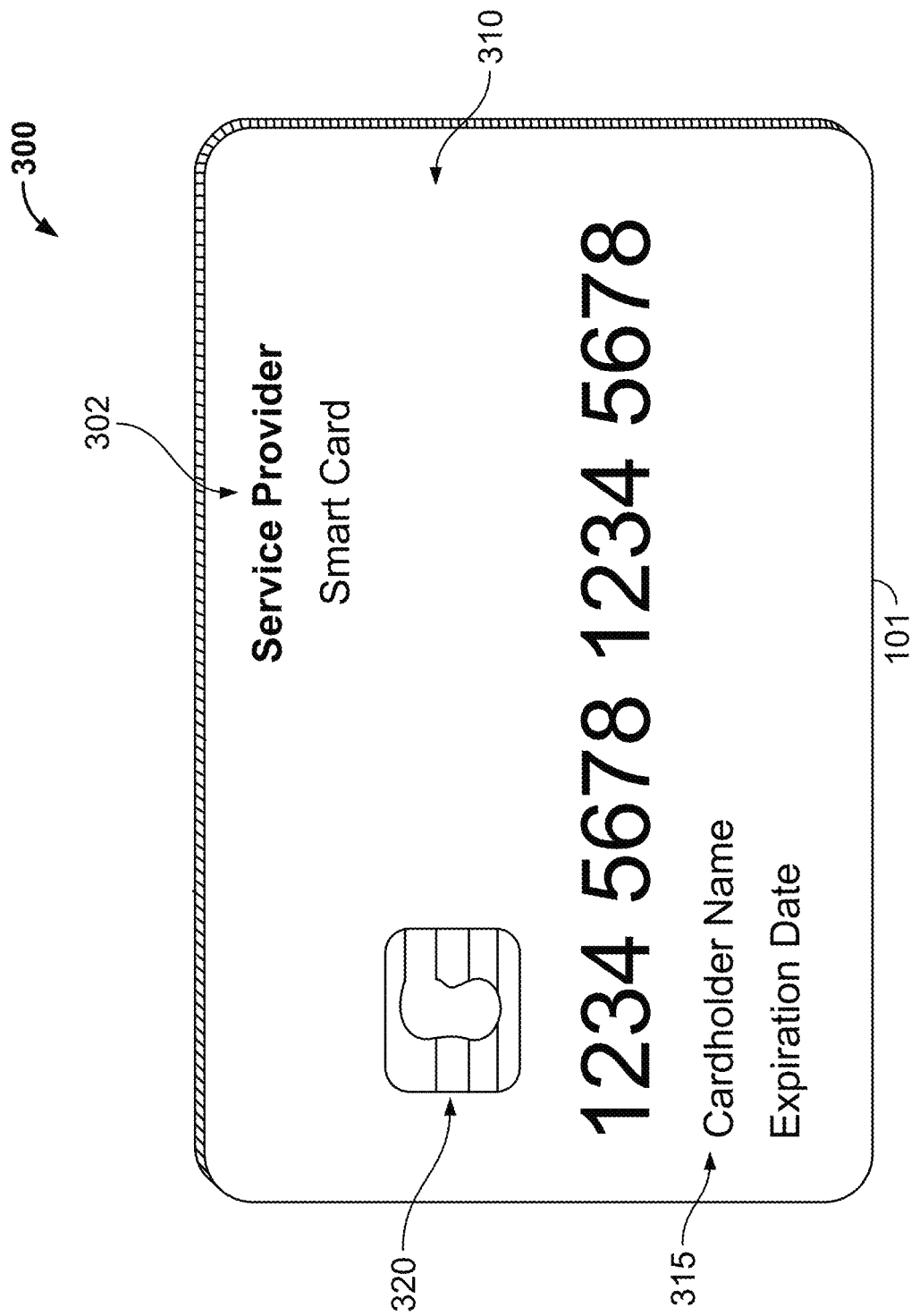
FIGS. 3A-3B illustrate an example contactless card.

FIG. 3A is a schematic 300 illustrating an example configuration of a contactless card 101, which may include a payment card, such as a credit card, debit card, or gift card, issued by a service provider as displayed as service provider indicia 302 on the front or back of the contactless card 101. In some examples, the contactless card 101 is not related to a payment card, and may include, without limitation, an identification card. In some examples, the contactless card may include a dual interface contactless payment card, a rewards card, and so forth. The contactless card 101 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

Figure 3B:
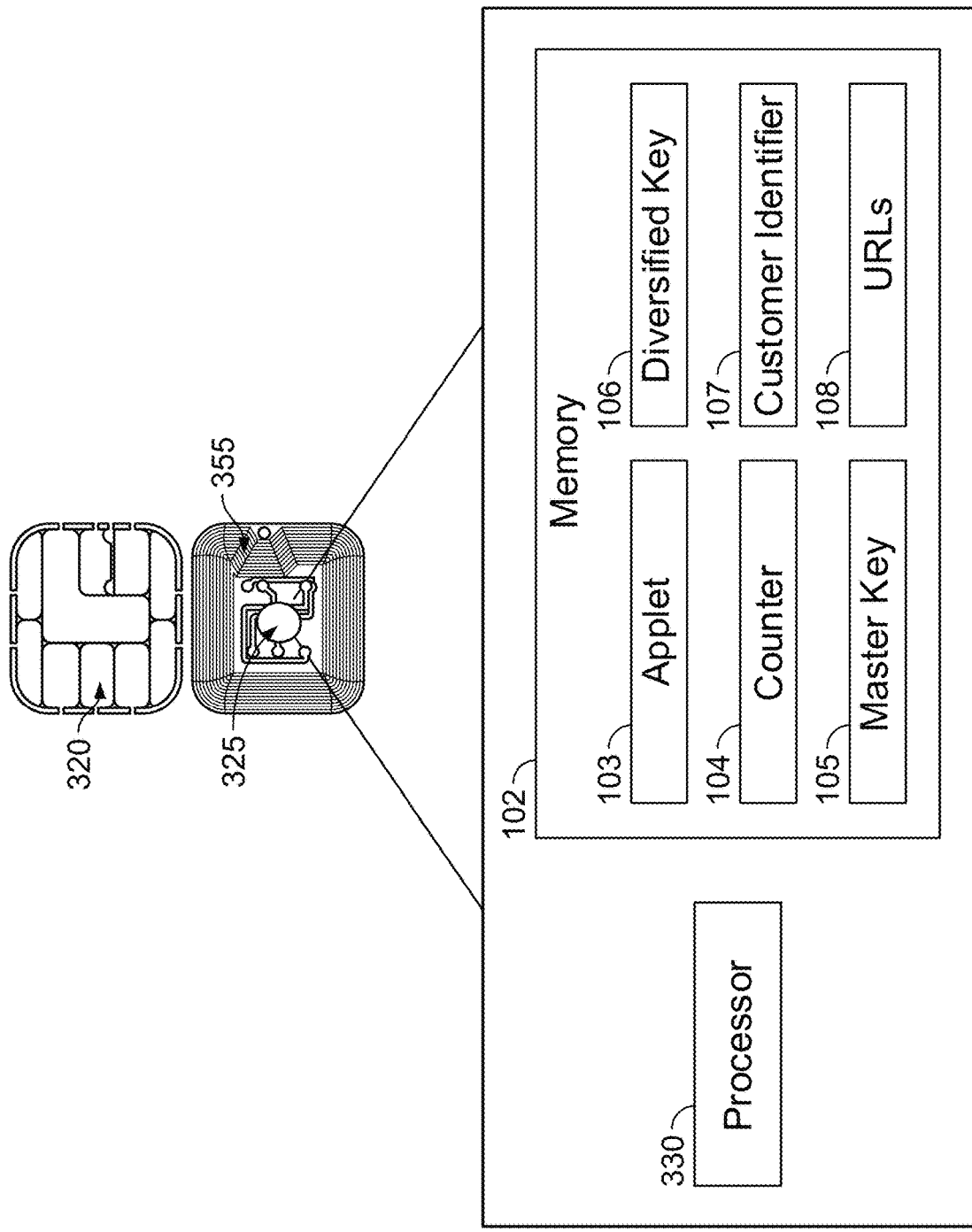

The contactless card 101 may also include identification information 315 displayed on the front and/or back of the card, and a contact pad 320. The contact pad 320 may include one or more pads and be configured to establish contact with another client device, such as an ATM, a user device, smartphone, laptop, desktop, or tablet computer via contactless cards. The contact pad may be designed in accordance with one or more standards, such as ISO/IEC 7816 standard, and enable communication in accordance with the EMV protocol. The contactless card 101 may also include processing circuitry, antenna and other components as will be further discussed in FIG. 3B. These components may be located behind the contact pad 320 or elsewhere on the substrate 310, e.g. within a different layer of the substrate 310, and may electrically and physically coupled with the contact pad 320. The contactless card 101 may also include a magnetic strip or tape, which may be located on the back of the card (not shown in FIG. 3A). The contactless card 101 may also include a Near-Field Communication (NFC) device coupled with an antenna capable of communicating via the NFC protocol. Embodiments are not limited in this manner.

As illustrated, the contact pad 320 of contactless card 101 may include processing circuitry 325 for storing, processing, and communicating information, including a processor 330, a memory 102, and one or more communications interface 109. It is understood that the processing circuitry 325 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 102 may be encrypted memory utilizing an encryption algorithm executed by the processor 330 to encrypt data.

The memory 102 may be configured to store one or more applets 103, one or more counters 104, the master key 105, a diversified key 106, a customer ID 107, and one or more URLs 108. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The one or more counters 104 may comprise a numeric counter sufficient to store an integer. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card 101 associated with the customer's account.

The processor 330 and memory elements of the foregoing exemplary embodiments are described with reference to the contact pad 320, but the present disclosure is not limited thereto. It is understood that these elements may be implemented outside of the contact pad 320 or entirely separate from it, or as further elements in addition to processor 330 and memory 102 elements located within the contact pad 320.

In some examples, the contactless card 101 may comprise one or more antenna(s) 355. The one or more antenna(s) 355 may be placed within the contactless card 101 and around the processing circuitry 325 of the contact pad 320. For example, the one or more antenna(s) 355 may be integral with the processing circuitry 325 and the one or more antenna(s) 355 may be used with an external booster coil. As another example, the one or more antenna(s) 355 may be external to the contact pad 320 and the processing circuitry 325.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the power connection of the contactless card 101, which may be functionally maintained through one or more capacitors. The contactless card 101 may communicate back by switching a load on the coil or load modulation. Load modulation may be detected in the terminal's coil through interference. More generally, using the antenna(s) 355, processor 330, and/or the memory 102, the contactless card 101 provides a communications interface to communicate via NFC, Bluetooth, and/or Wi-Fi communications.

As explained above, contactless card 101 may be built on a software platform operable on smart cards or other devices having limited memory, such as JavaCard, and one or more or more applications or applets may be securely executed. Applet 103 may be added to contactless cards to provide a one-time password (OTP) for multifactor authentication (MFA) in various mobile application-based use cases. Applet 103 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applets 103 may be configured to encode the OTP as an NDEF type 4 well known type text tag. In some examples, NDEF messages may comprise one or more records, such as a cryptogram and an unencrypted customer ID 107 (or other unencrypted unique identifier for the card 101 and/or the associated account). The applets 103 may be configured to add one or more static tag records in addition to the OTP record.

In some examples, the one or more applets 103 may be configured to emulate an RFID tag. The RFID tag may include one or more polymorphic tags. In some examples, each time the tag is read, different cryptographic data is presented that may indicate the authenticity of the contactless card 101. Based on the one or more applet 103, an NFC read of the tag may be processed, the data may be transmitted to a server, such as a server of a banking system, and the data may be validated at the server.

In some examples, the contactless card 101 and server 120 may include certain data such that the card may be properly identified. The contactless card 101 may include one or more unique identifiers (not pictured). Each time a read operation takes place, the counter 104 may be configured to increment. In some examples, each time data from the contactless card 101 is read (e.g., by a computing device 110), the counter 104 is transmitted to the server for validation and determines whether the counter 104 are equal (as part of the validation) to a counter 104 of the server.

The one or more counter 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 since there is no communication between applet 103 on the contactless card 101. In some examples, the contactless card 101 may comprise a first applet 103-1, which may be a transaction applet, and a second applet 103-2, which may be an authentication applet for authenticating calls as disclosed herein. Each applet 103-1 and 103-2 may comprise a respective counter 104.

In some examples, the counter 104 may get out of sync. In some examples, to account for accidental reads that initiate transactions, such as reading at an angle, the counter 104 may increment but the application does not process the counter 104. In some examples, when the device 110 is woken up, NFC may be enabled and the device 110 may be configured to read available tags, but no action is taken responsive to the reads.

To keep the counter 104 in sync, an application, such as a background application, may be executed that would be configured to detect when the device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 3.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 4:
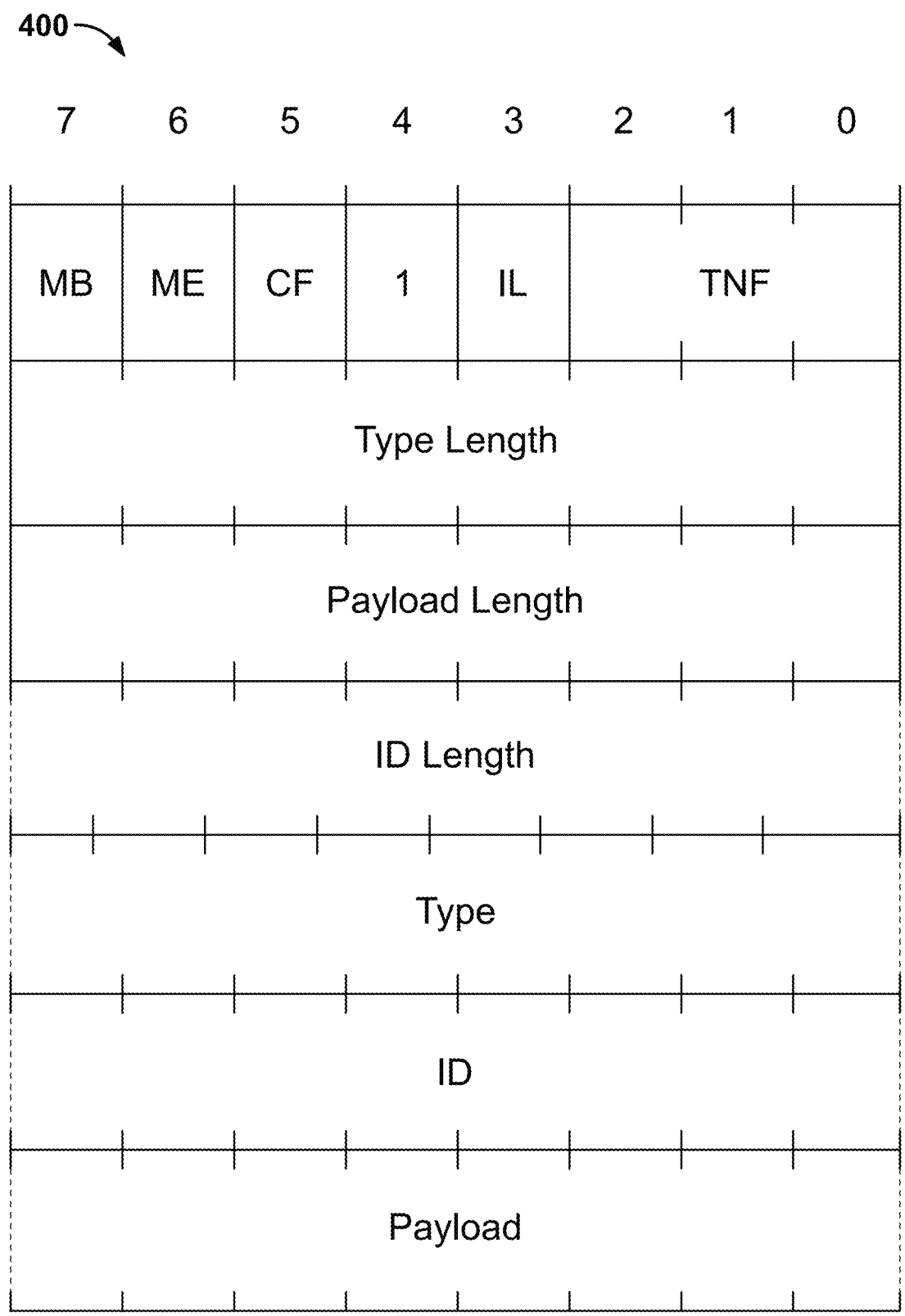
FIG. 4 illustrates a data structure in accordance with one embodiment.

FIG. 4 illustrates an NDEF short-record layout (SR=1) data structure 400 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850104; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. In various embodiments, the payload of the data structure 400 may store a cryptogram (e.g., an encrypted customer ID 107) and any other relevant data, such as an unencrypted customer ID 107, and/or some other unencrypted value that uniquely identifies a card 101 and/or an account associated with the card 101.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in other embodiments. In addition, the given logic flow may be implemented by a hardware element, a software element executed by a processor, or any combination thereof. The embodiments are not limited in this context.

Figure 5:
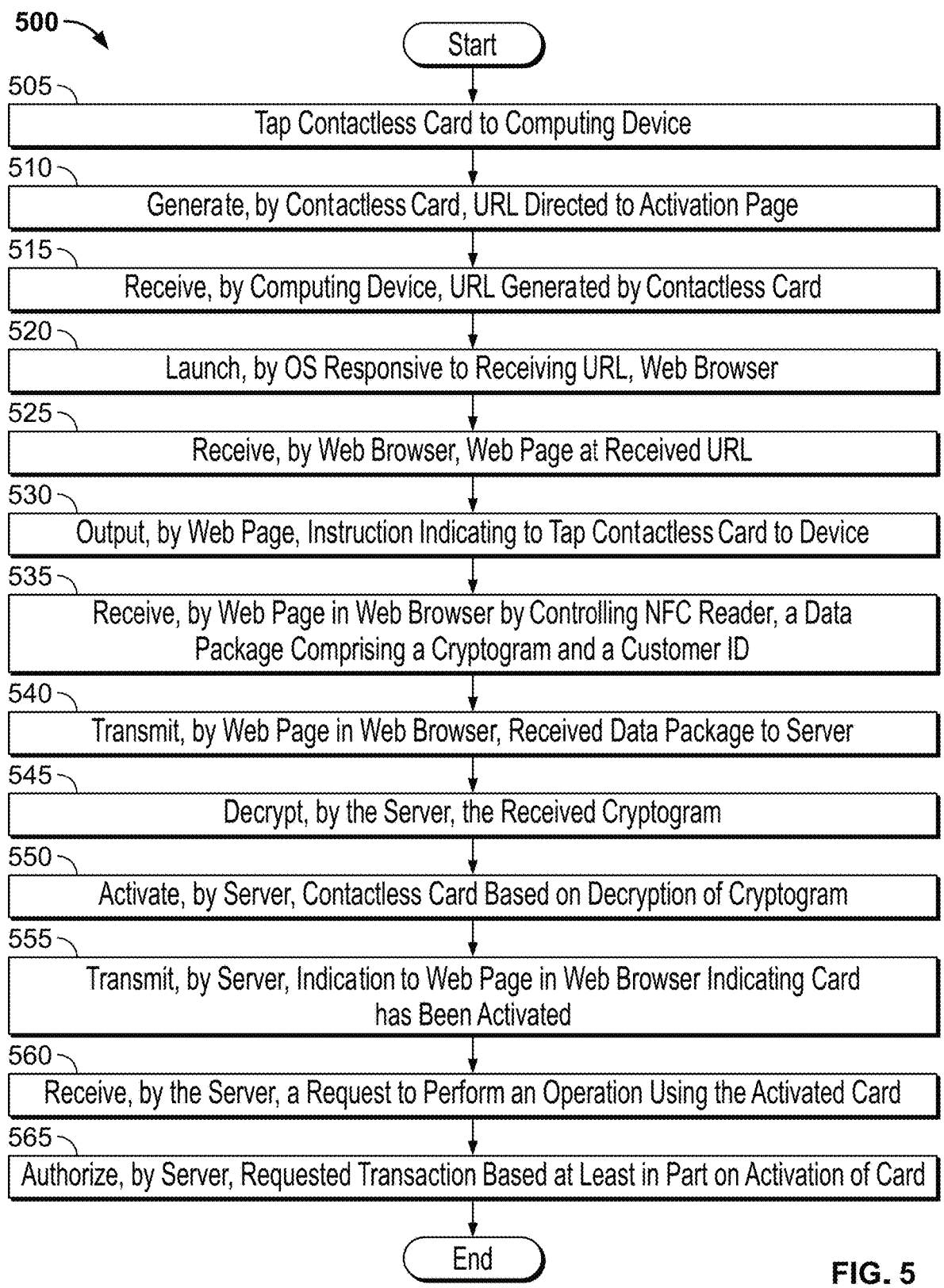
FIG. 5 illustrates a first logic flow.

FIG. 5 illustrates an embodiment of a logic flow 500. The logic flow 500 may be representative of some or all of the operations executed by one or more embodiments described herein. For example, the logic flow 500 may include some or all of the operations to activate a contactless card 101 using a web browser 115. Embodiments are not limited in this context.

In block 505, a contactless card 101 is tapped to a computing device 110, such as a smartphone. At block 510, an applet 103 executing on the contactless card 101 generates (or selects) a URL 108 directed to a resource, such as the server 120 and/or a component thereof. At block 515, the computing device 110 receives the URL 108 from the contactless card 101, e.g., via NFC. At block 520, an OS 112 of the computing device 110 launches a web browser 115 and provides the URL 108 to the web browser 115. Doing so may cause the web browser 115 to request the resource located at the URL 108 from the web server 127 of the server 120, e.g., via an HTTP request. At block 525, the web browser 115 receives a web page 134 from the web server 127 based on the request for the resource at the URL 108. The web browser 115 may render, load, or otherwise process the received web page 134 and display the web page 134 on a display device. The web page 134 may generally include instructions that allow the web page 134 to control the communications interface 118 of the device 110, thereby allowing the web page 134 and/or the web browser 115 to control or otherwise engage in NFC communications with the contactless card 101.

At block 530, the web page 134 outputs an instruction to tap the contactless card 101 to the computing device 110. In response, the user may tap the contactless card 101 to the computing device 110 (e.g., a second tapping instance). Responsive to detecting the contactless card 101 coming within communications range of the device 110, the web page 134 may instruct the applet 103 to generate a data package (e.g., an NDEF file) comprising a cryptogram and an unencrypted customer ID 107 (or any other unique identifier). At block 535, the web page 134 and/or web browser 115 may read the data package (e.g., the NDEF file) generated by the contactless card 101 by controlling the communications interface 118. In some embodiments, the web page 134 may process the data package, e.g., to format, extract values, modify the package, include an indication that the data package is part of a request to activate the card 101, etc. At block 540, the web page 134 and/or the web browser 115 may transmit the received data package to the server 120 and/or any component thereof.

At block 545, the server 120 attempts to decrypt or otherwise validate the cryptogram in the received data package. If the decryption and/or validation is not successful, the server 120 may reject the request to activate the contactless card 101. Otherwise, the server may approve the request to activate the contactless card 101 based on a successful decryption and/or validation of the cryptogram. At block 550, the server 120 activates the contactless card 101 based on the decryption and/or validation. For example, the server 120 may update the account data 124 to reflect the activation of the contactless card 101, thereby allowing the contactless card 101 to be used to process payments and/or perform other functions that require the contactless card 101 to be in an activated state (or activated payment state).

At block 555, the server 120 may transmit a response to the web browser 115 including a decryption result of the successful decryption and indicating that the contactless card 101 has been activated. At block 560, the server 120 receives a request to process a payment using the activated contactless card 101. At block 565, the server 120 (e.g., the authentication application 123) may approve the request received at block 560 based at least in part on the activation of the contactless card 101 at block 550.

Figure 6:
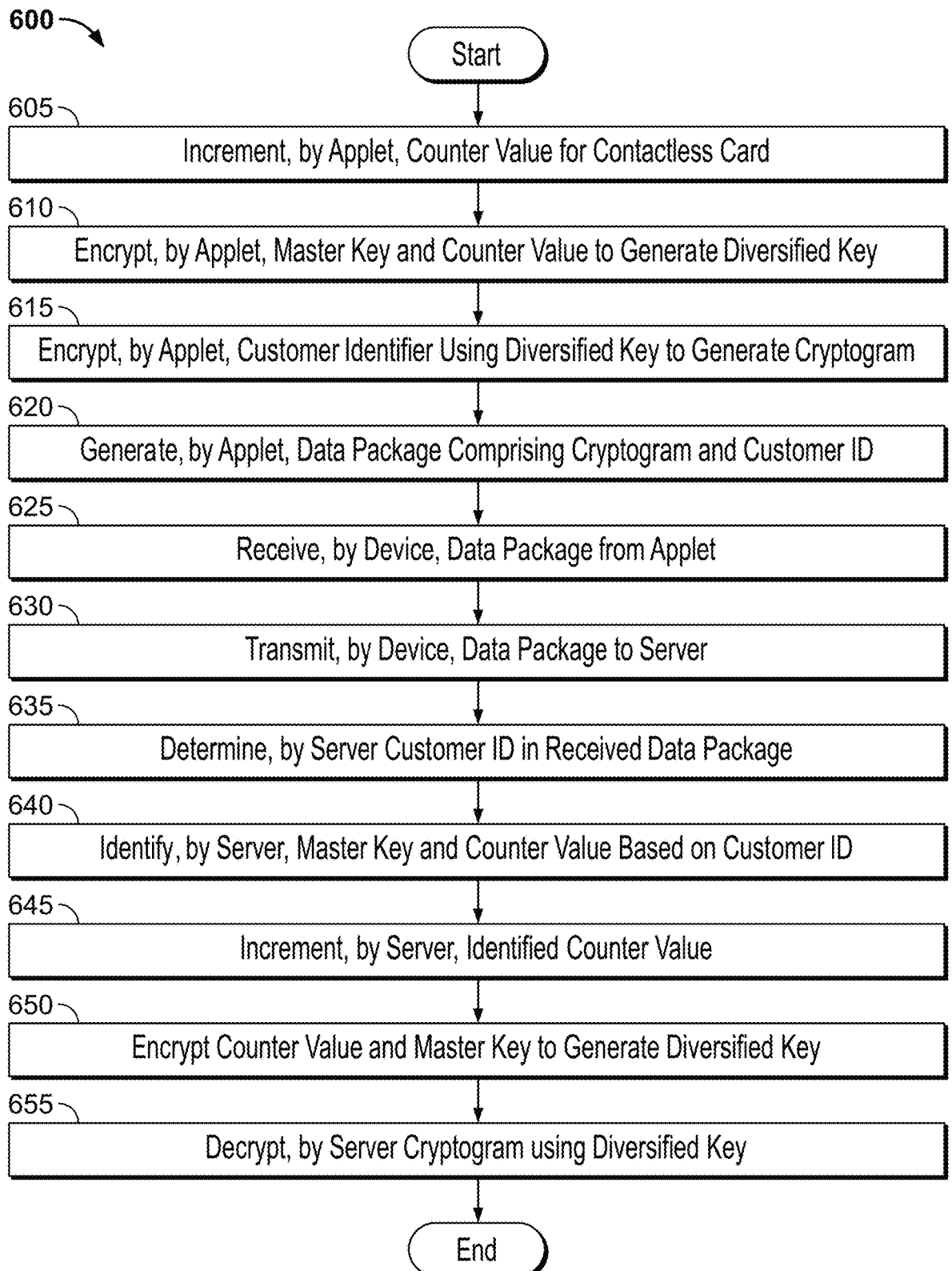
FIG. 6 illustrates a second logic flow.

FIG. 6 illustrates an embodiment of a logic flow 600. The logic flow 600 may be representative of some or all of the operations executed by one or more embodiments described herein. For example, the logic flow 600 may include some or all of the operations to activate a contactless card 101 using a web browser 115. More specifically, the logic flow 600 may include some or all of the operations executed by the system 100 to activate the contactless card 101 using the web browser 115. Embodiments are not limited in this context.

As shown, at block 605, the applet 103 of the contactless card 101 may increment the counter 104 responsive to an instruction from the web page 134 to generate a cryptogram to activate the card 101. The web page 134 may provide the instruction to the card 101 by controlling the communications interface 118 of the device 110. At block 610, the applet 103 encrypts the master key 105 and incremented counter value 104 using a cryptographic function. Doing so may result in a diversified key 106. At block 615, the applet 103 encrypts some data (e.g., the customer ID 107, or another unique identifier) using the diversified key 106 to generate a cryptogram. At block 620, the applet 103 generates a data package (e.g., an NDEF file) that includes the cryptogram generated at block 615 and an unencrypted identifier (e.g., the unencrypted customer ID 107). At block 625, the device 110 receives the data package generated at block 620. Generally, the web page 134 may instruct the communications interface 118 to read the data package from the contactless card 101.

At block 630, the device 110 may transmit the data package to the server 120. At block 635, the server 120 and/or any component thereof may determine the unencrypted customer ID 107 in the data package. Doing so may allow the server 120 to identify the master key 105 and/or counter value 104 for the card 101 in the account data 124 at block 640. At block 645, the server 120 may increment the counter value 104 identified at block 640. At block 650, the server 120 may encrypt the master key 105 identified at block 640 and the counter value 104 incremented at block 645 with a cryptographic function to generate an instance of the diversified key 106. At block 655, the server 120 may decrypt the cryptogram using the diversified key 106. The server 120 may verify the cryptogram based on the decryption and/or one or more additional operations. For example, the server 120 may compare the result of the decryption at block 655 to the stored customer ID 107 in the account data 124. The server 120 may validate the cryptogram if the comparison results in a match. In such an example, the server 120 may activate the contactless card 101, e.g., by updating a record in the account data 124 to reflect the activation. Otherwise, the server 120 may refrain from activating the contactless card 101 such that the contactless card 101 remains in an inactivated payment state.

Figure 7:
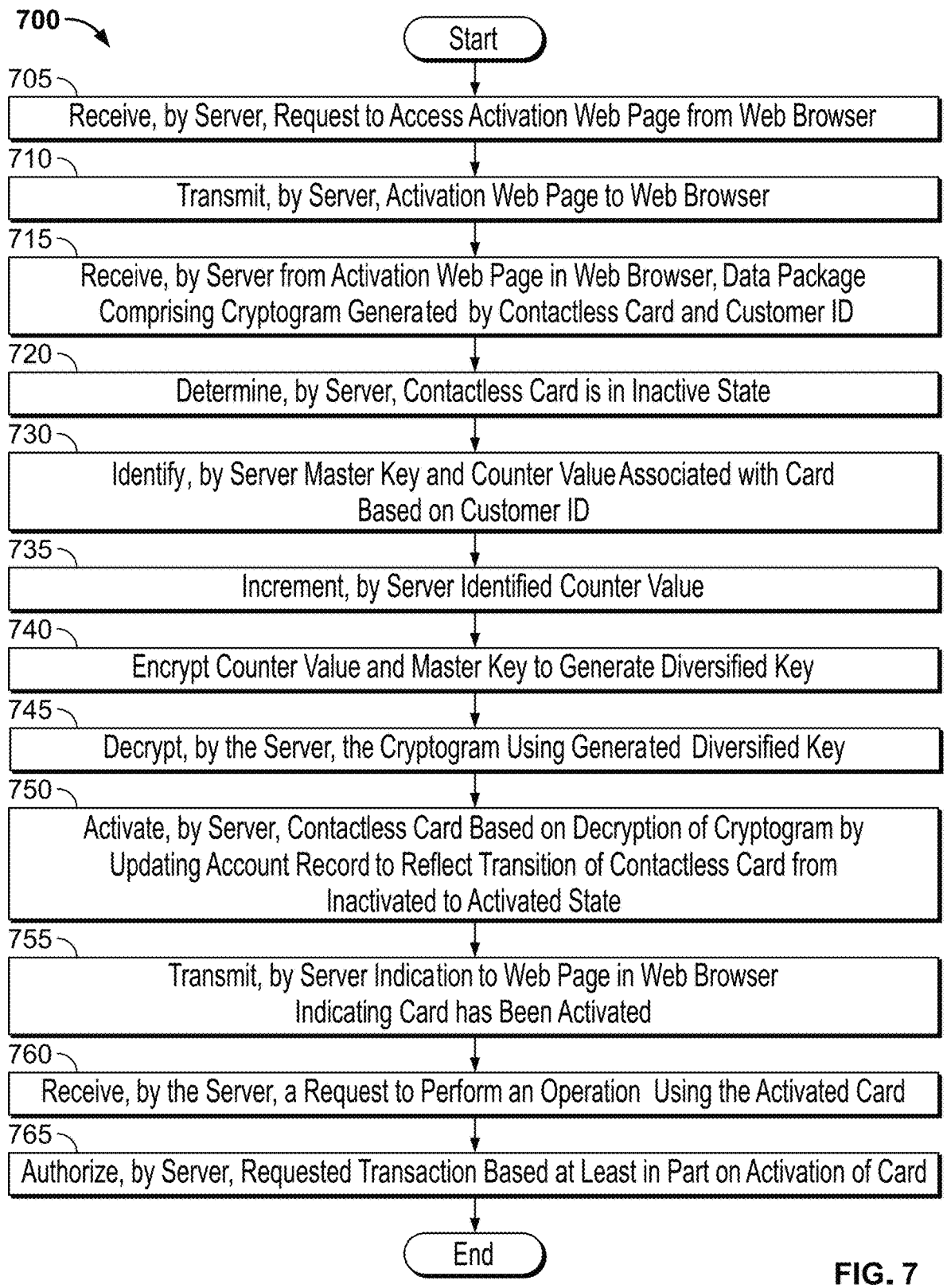
FIG. 7 illustrates a third logic flow.

FIG. 7 illustrates an embodiment of a logic flow 700. The logic flow 700 may be representative of some or all of the operations executed by one or more embodiments described herein. For example, the logic flow 700 may include some or all of the operations to activate a contactless card 101 using a web browser 115. Embodiments are not limited in this context.

As shown, at block 705, the server 120 and/or any component thereof receives a request to access a card activation web page 134 from a web browser 115 of a device 110. At block 710, the server 120 transmits an activation web page 134-1 to the requesting web browser 115. At block 715, the server 120 receives a data package generated by the contactless card 101. The data package may be read from the contactless card 101 by the web browser 115 controlling the NFC capabilities of the communications interface 118. The data package may comprise a cryptogram and an unencrypted customer identifier. At block 720, the server 120 determines that the contactless card 101 is in an inactivated payment state, e.g., based on the account data 124.

At block 730, the server 120 identifies the master key 105 and/or counter value 104 for the card 101 in the account data 124 based on the unencrypted customer identifier in the data package received at block 715. At block 735, the server 120 may increment the counter value 104 identified at block 730. At block 740, the server 120 may encrypt the master key 105 identified at block 730 and the counter value 104 incremented at block 735 with a cryptographic function to generate an instance of the diversified key 106. At block 745, the server 120 may decrypt and/or otherwise validate the cryptogram using the diversified key 106 generated at block 740. At block 750, the server 120 may activate the contactless card 101 by updating a record in the account data 124 to reflect that the contactless card 101 has been transitioned from an inactivated payment state to an activated payment state.

At block 755, the server 120 may transmit an indication to the web page 134-1 in the web browser 115 reflecting that the decryption and/or validation was successful and that the contactless card 101 has been transitioned to an activated payment state. At block 760, the server 120 receives a request to perform an operation using the contactless card 101. For example, the web browser 115 may generate a request to process a purchase using the contactless card 101. At block 765, the server 120 may authorize the request based at least in part on the activation of the contactless card at block 750.

Figure 8:
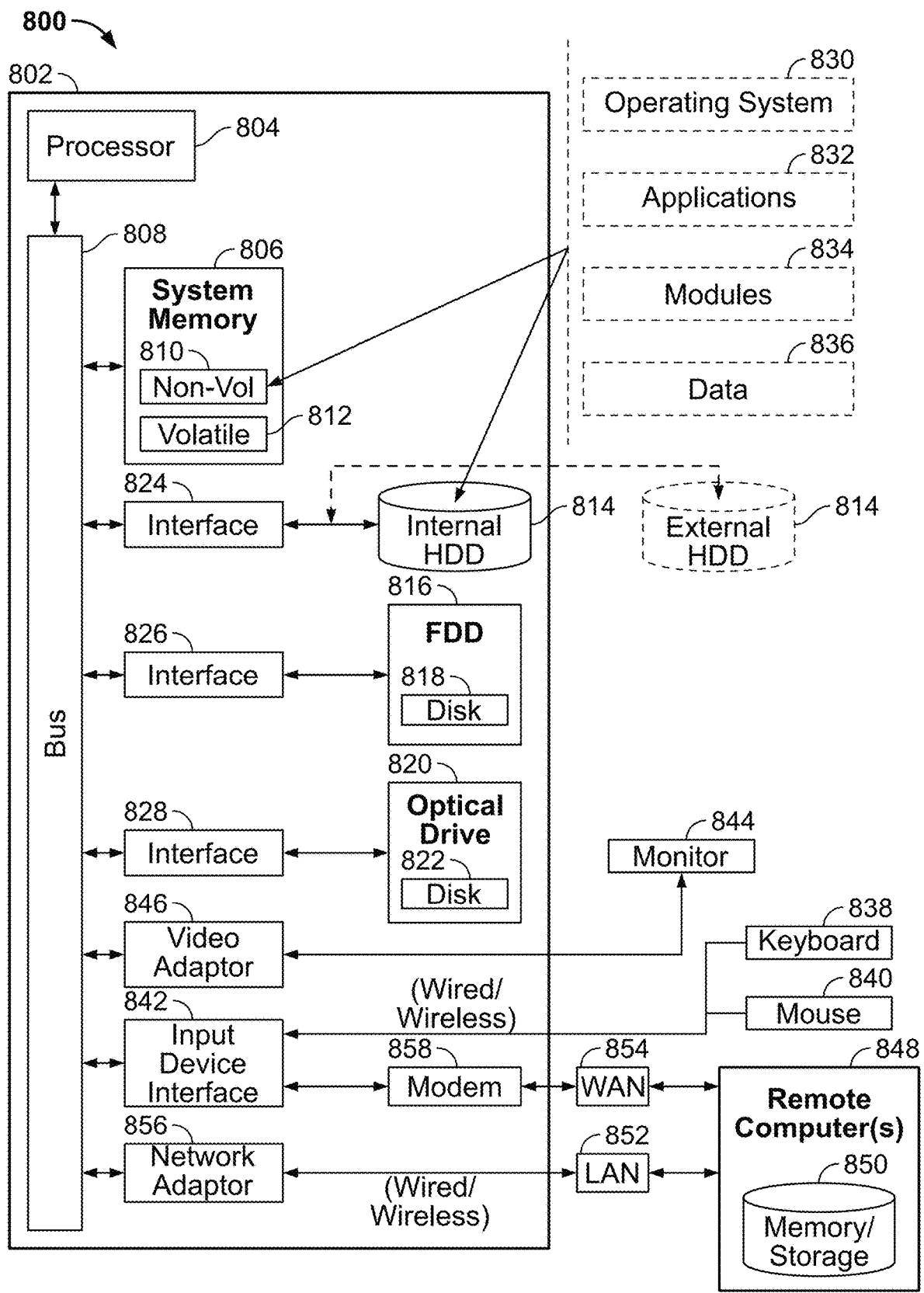
FIG. 8 illustrates a computer architecture in accordance with one embodiment.

FIG. 8 illustrates an embodiment of an exemplary computer architecture 800 comprising a computing system 802 that may be suitable for implementing various embodiments as previously described. In one embodiment, the computer architecture 800 may include or be implemented as part of computing system 100. In some embodiments, computing system 802 may be representative, for example, of the contactless card 101, computing devices 110, and server 120 of the system 100. The embodiments are not limited in this context. More generally, the computing architecture 800 is configured to implement all logic, applications, systems, methods, apparatuses, and functionality described herein with reference to FIGS. 1A-7.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processor 804, a system memory 806 and a system bus 808. The processor 804 can be any of various commercially available processors.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile 810 and/or volatile 812 memory. A basic input/output system (BIOS) can be stored in the non-volatile memory 810.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 808 the by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile memory 810, and volatile memory 812, including an operating system 822, one or more applications 842, other program modules 824, and program data 826. In one embodiment, the one or more applications 842, other program modules 824, and program data 826 can include, for example, the various applications and/or components of the system 100, such as the applet 103, counter 104, master key 105, diversified key 106, customer ID 107, URLs 108, web browser 115, data package 117, a cryptogram, the authentication application 123, account data 124, web server 127, and web pages 134.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 804 through an input device interface 836 that is coupled to the system bus 808 but can be connected by other interfaces such as a parallel port, IEEE 1394 serial port, a game port, a USB port, an IR interface, and so forth.

A monitor 844 or other type of display device is also connected to the system bus 808 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 808 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
    generating, by a first applet executing on a contactless card, a network address associated with a web page for card activation by selecting a uniform resource locator (URL) and adding dynamic data as one or more parameters of the URL;
    transmitting, by the contactless card to a client device via a wireless communications interface, the network address associated with the web page;
    generating, by the first applet, a data package comprising encrypted data and unencrypted data;
    transmitting, by the contactless card, the data package to the web page via the wireless communications interface;
    receiving, by the contactless card from the web page, an instruction to activate a payment applet of the contactless card; and
    activating, by the contactless card, the payment applet based on the instruction.

2. The method of claim 1, further comprising:
    incrementing, by the first applet, a counter value for the contactless card responsive to an activation request from the web page on the client device;
    encrypting, by the first applet, a master key and the counter value to generate a diversified key; and
    encrypting, by the first applet, the unencrypted data using the diversified key to generate the encrypted data,
    wherein the unencrypted data includes an unencrypted version of a customer identifier.

3. The method of claim 1, wherein generating the network address associated with the web page includes selecting, by the first applet, a link stored on the contactless card based on one or more rules.

4. The method of claim 1, further comprising:
    receiving, by the contactless card, a first request to process a payment prior to activating the payment applet;
    rejecting, by the contactless card, the first request based on the payment applet being in an inactive payment state;
    receiving, by the contactless card, a second request to process the payment subsequent to activating the payment applet; and
    processing, by the payment applet, the second request based on the payment applet being activated.

5. The method of claim 1, wherein the instruction to activate the payment applet is received based on a server transitioning the contactless card from an inactivated payment state to an activated payment state based on the encrypted data.

6. The method of claim 1, wherein the contactless card transmits the network address associated with the web page and the data package via near field communication (NFC) in respective NFC Forum Data Exchange Format (NDEF) files, and wherein activating the payment applet comprises transitioning the payment applet from an inactive payment state to an active payment state.

7. A non-transitory computer-readable storage medium, the computer-readable storage medium including instructions that when executed by a processor of a contactless card, cause the processor to:
    generate, by a first applet executed by the processor, a network address associated with a web page for card activation by selecting a uniform resource locator (URL) and adding dynamic data as one or more parameters of the URL;
    transmit, to a client device via a wireless communications interface, the network address associated with the web page;
    generate, by the first applet, a data package comprising encrypted data and unencrypted data;
    transmit the data package to the web page via the wireless communications interface;
    receive, from the web page, an instruction to activate a payment applet of the contactless card; and
    activate the payment applet based on the instruction.

8. The computer-readable storage medium of claim 7, wherein the instructions further cause the processor to:
    increment, by the first applet, a counter value for the contactless card responsive to an activation request from the web page on the client device;
    encrypt, by the first applet, a master key and the counter value to generate a diversified key; and
    encrypt, by the first applet, the unencrypted data using the diversified key to generate the encrypted data,
    wherein the unencrypted data includes an unencrypted version of a customer identifier.

9. The computer-readable storage medium of claim 7, wherein generating the network address associated with the web page includes selecting, by the first applet, a link stored on the contactless card based on one or more rules.

10. The computer-readable storage medium of claim 7, wherein the instructions further cause the processor to:
    receive a first request to process a payment prior to activating the payment applet;
    reject the first request based on the payment applet being in an inactive payment state;
    receive, a second request to process the payment subsequent to activating the payment applet; and
    process the second request based on the payment applet being activated.

11. The computer-readable storage medium of claim 7, wherein the instruction to activate the payment applet is received based on a server transitioning the contactless card from an inactivated payment state to an activated payment state based on the encrypted data.

12. The computer-readable storage medium of claim 7, wherein the contactless card transmits the network address associated with the web page and the data package via near field communication (NFC) in respective NFC Forum Data Exchange Format (NDEF) files, and wherein activating the payment applet comprises transitioning the payment applet from an inactive payment state to an active payment state.

13. A contactless card, comprising:
    a processor; and
    a memory storing instructions that, when executed by the processor, cause the processor to:
    generate, by a first applet executed by the processor, a network address associated with a web page for card activation by selecting a uniform resource locator (URL) and adding dynamic data as one or more parameters of the URL;

transmit, to a client device via a wireless communications interface, the network address associated with the web page;

generate, by the first applet, a data package comprising encrypted data and unencrypted data;

transmit the data package to the web page via the wireless communications interface;

receive, from the web page, an instruction to activate a payment applet of the contactless card; and activate the payment applet based on the instruction.

14. The contactless card of claim 13, wherein the instructions further cause the processor to:

increment, by the first applet, a counter value for the contactless card responsive to an activation request from the web page on the client device;

encrypt, by the first applet, a master key and the counter value to generate a diversified key; and encrypt, by the first applet, the unencrypted data using the diversified key to generate the encrypted data, wherein the unencrypted data includes an unencrypted version of a customer identifier.

15. The contactless card of claim 13, wherein generating the network address associated with the web page includes selecting, by the first applet, a link stored on the contactless card based on one or more rules.

16. The contactless card of claim 13, wherein the instructions further cause the processor to:

receive a first request to process a payment prior to activating the payment applet;

reject the first request based on the payment applet being in an inactive payment state;

receive a second request to process the payment subsequent to activating the payment applet; and process the second request based on the payment applet being activated.

17. The contactless card of claim 13, wherein the memory stores the payment applet and another applet.

* * * * *